Dec. 20, 1966  J. A. BONUCHI ET AL  3,293,049
METHOD OF DEFROSTING FOOD PRODUCTS
Filed March 20, 1964  4 Sheets-Sheet 1

INVENTORS.
James A. Bonuchi
Richard A. Braeking
BY
Hovey, Schmidt, Johnson & Hovey
ATTORNEYS.

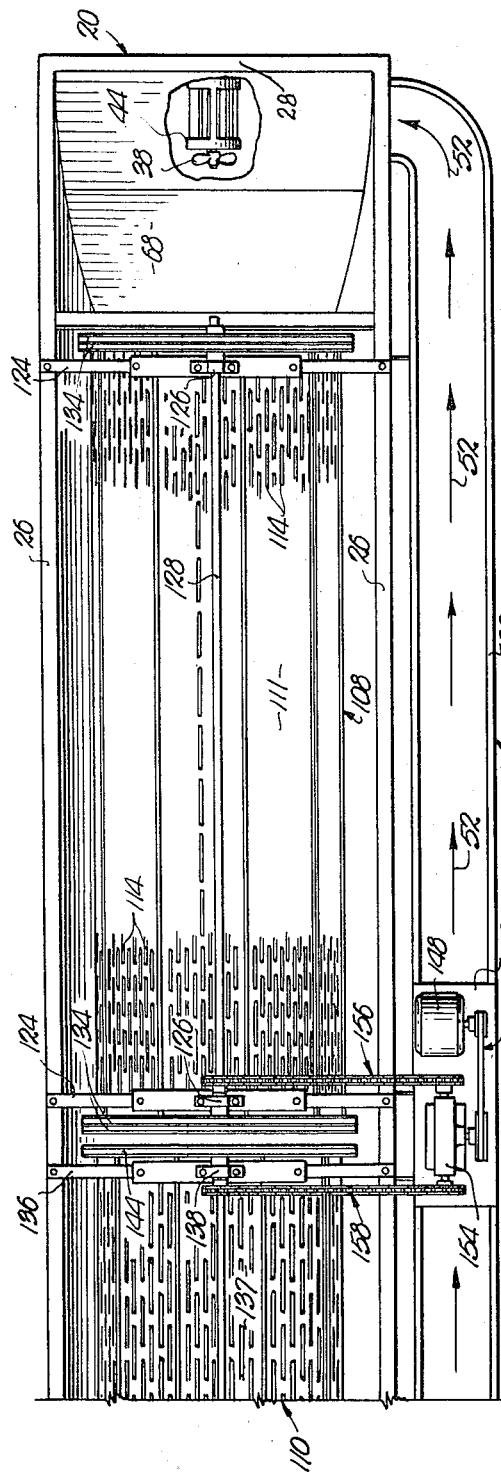

Dec. 20, 1966   J. A. BONUCHI ET AL   3,293,049
METHOD OF DEFROSTING FOOD PRODUCTS
Filed March 20, 1964   4 Sheets-Sheet 3

INVENTORS.
James A. Bonuchi
Richard A. Braeking
BY
Hovey, Schmidt, Johnson & Hovey
ATTORNEYS.

INVENTORS.
James A. Bonuchi
Richard A. Braeking
BY Hovey, Schmidt, Johnson & Hovey
ATTORNEYS.

United States Patent Office 3,293,049
Patented Dec. 20, 1966

3,293,049
METHOD OF DEFROSTING FOOD PRODUCTS
James A. Bonuchi, Merriam, Kans., and Richard A. Braeking, Kansas City, Mo., assignors to Gordon Johnson Company, Kansas City, Mo., a corporation of Missouri
Filed Mar. 20, 1964, Ser. No. 353,323
6 Claims. (Cl. 99—192)

This invention relates to the defrosting of food products initially frozen together to form a block of sizable proportions and to apparatus and method for breaking the blocks to separate the individual food products from each other and thereafter applying heat to the products to raise their temperatures to predetermined values.

For long-term storage of food products such as poultry or the like, the products are initially placed in containers and then moved into the freezing room where they are subjected to the low temperature of the room and thereby frozen. As the same are frozen, the individual products become bonded together by the freezing of moisture on the packages in which the products are disposed, or by virtue of moisture on the products themselves if the latter are unpackaged. The bonding of the products forms a relatively large block which, if broken by pounding thereon, would strew the various products in all directions, thus requiring additional time and effort to collect the products prior to heating the same to elevate their temperatures.

The separated food products are generally immersed in a liquid which is maintained at a predetermined temperature so that heat will flow from the liquid to the products to in turn raise their temperatures. It is preferable that the blocks be broken into their individual products before the immersion process is performed since the liquid may then contact substantially all of the external surfaces of the products to in turn cause the heating process to be more efficient.

The blocks are generally unwieldy and considerable effort is expended to break the same to separate the food products thereof from each other. There is also the risk of damaging the products especially if sharp blows are applied thereto to break the bond therebetween.

In view of the necessity of defrosting large numbers of blocks of the aforesaid type for scheduling convenience, it has become recognized that the aforesaid process of defrosting could be expedited and rendered substantially automatic if apparatus capable of performing the method of defrosting of the blocks of food products were devised so as to eliminate the time and effort now required to perform the same process.

Accordingly, the present invention provides apparatus and a method for performing this process and, therefore, the invention represents a distinct advance over the art by eliminating the costly expenditure of time and effort to separately perform the steps of breaking the blocks into their individual parts and thereafter manually moving the parts to a location where they are immersed in a heating liquid. The present invention provides structure for breaking the blocks as well as heating the products separated from each other, all of which is accomplished in a much shorter time and in a more efficient manner than is capable of being accomplished by conventional apparatus and methods.

It is, therefore, the primary object of the present invention to break relatively large blocks of individual chilled food products to separate the products from each other and thereafter heat the separated products in a more efficient manner and in less time than the time required to break the blocks and heat the products by conventional apparatus following the steps of methods heretofore utilized.

A further object of the present invention is the provision of apparatus for alternately lifting and dropping the blocks in a confined zone adjacent a region containing a heating liquid whereby the blocks are broken to separate their individual food products from each other before the separated products move into the region and are heated by the liquid therein.

A further object of the present invention is the provision of a method for breaking blocks of the aforesaid character and heating the separated food products in a manner which requires little or no attention except to feed the blocks into the zone and collecting the separated food products heated to a predetermined degree by the liquid in said region.

Another object of the instant invention is the provision of structure for containing a supply of heating liquid and means for creating a flow of the liquid through the containing means to facilitate the travel of the blocks and separated products through the breaking zone and the heating region while at the same time causing the liquid to be maintained at a uniform temperature throughout the region and zone when the liquid is heated by an external source.

Yet another object of the present invention is the provision of structure for breaking the blocks into their individual products by lifting and dropping the same on a supporting surface partially immersed in the heating liquid, whereby the fall of the block is cushioned to prevent damage to the products comprising the block.

Still another object of the present invention is the provision of structure for tumbling the separated products about in the heating liquid so that the liquid will contact substantially the entire exposed area of the product and thereby result in a more efficient heating of the latter prior to the removal of the products from the heating zone.

Another object of the present invention is the provision of reversible, flow-creating means for causing the liquid to flow in either of a pair of opposed directions through the zone and region so that the rate of travel of the blocks and separated products therethrough may be facilitated or impeded, depending upon the final desired temperature of the products.

In the drawings:

FIG. 2a is a top plan view of the portion of the machine illustrated in FIG. 1a;

FIG. 2b is a top plan view of the portion of the apparatus illustrated in FIG. 1b;

Figure 10:
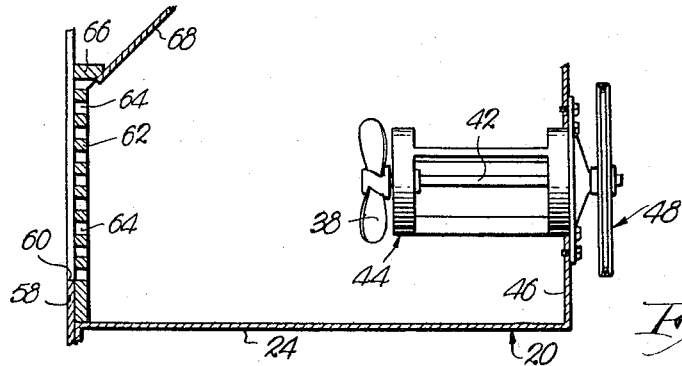
Figure 8:
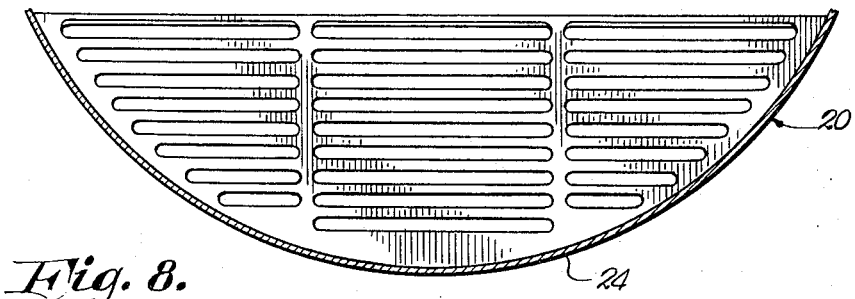
FIG. 8 is an enlarged, end elevational view of a grid associated with the inlet of the breaking section to prevent the retrograde movement of blocks and food products when liquid flow through the breaking section is reversed.
Figure 9:
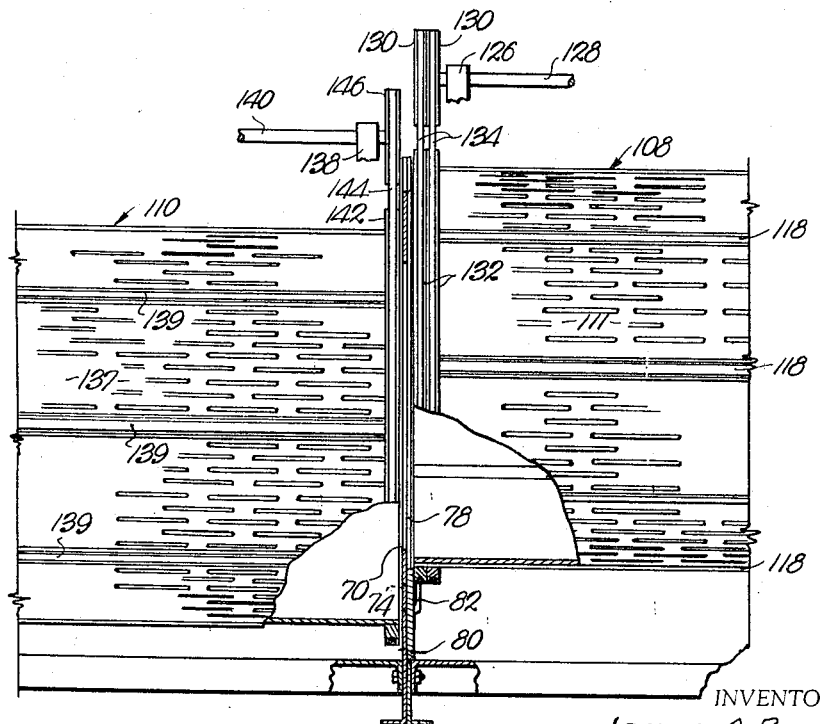

FIG. 9 is an enlarged, fragmentary, side elevational view of the reels or tubes of the breaking and heating sections and illustrating the reel of the breaking section being elevated with respect to the reel of the heating section; and FIG. 10 is a fragmentary, cross-sectional view adjacent the inlet end of the breaking section and illustrating the reversible impeller means for creating liquid flow in either of a pair of opposed directions through the breaking and heating zones, and further illustrating the position of the grid of FIG. 8 in alignment with the impeller means.

The present invention includes a receptacle for containing a heating liquid to a predetermined level therein and provided with means for creating a circulatory flow of the heating liquid through the receptacle and, in conjunction with a heat source in the liquid, to maintain the liquid at a predetermined temperature.

A pair of elongated, hollow members each in the form of a reel or tube, are mounted for rotation about their longitudinal axes in the receptacle and are aligned therewith. One of the hollow members is elevated with respect to the other member and provides structure for breaking blocks of food products received therein prior to the passage of the products separated by the breaking of the blocks into the other member. The first member is imersed in the liquid only to a slight degree so that the liquid will serve to cushion the fall of the blocks as the same are lifted and dropped for the purpose of breaking the blocks. The other member is immersed to a greater degree in the liquid so that the individual, separated food products will be substantially immersed in the liquid to in turn raise the temperature of the products prior to the removal of the products from the liquid.

Structure is provided in the breaking member for elevating the blocks and permitting the same to drop, and structure is provided in the heating member to tumble the separated food products about so that the liquid will contact the entire exposed surfaces of the products.

An inclined ramp at the inlet of the apparatus directs the blocks into the breaking member and provides means for creating a movement of the blocks and separated food products through the member and toward and into the heating member. To a slight degree, the flow of liquid in the receptacle also facilitates the movement of the blocks and products through the two members.

Elongated receptacle 20 has an open top and is supported above ground level by a number of ground-engaging legs 22 so that the generally arcuate bottom 24 of receptacle 20 will be above the surface on which legs 22 are disposed and the upper marginal edges 26 of receptacle 20 will be generally horizontal. Ends 28 and 30 of receptacle 20 are placed in fluid communication with each other by an elongated channel 32 having an open top 33 below the open top defined by edges 26 of receptacle 20, and provided with a closed bottom 35 above the lowermost extremity of bottom 24 of receptacle 20. A liquid 34 placed in receptacle 20 will assume a common level 36 in both receptacle 20 and channel 32. A pipe 37 is adapted to be coupled with a source of the liquid 34 under pressure to direct the liquid into receptacle 20 through a branch line 39 under the control of a valve 41. A drain 43 controlled by a valve (not shown), permits liquid 34 to be removed from receptacle 20.

Figure 1A:
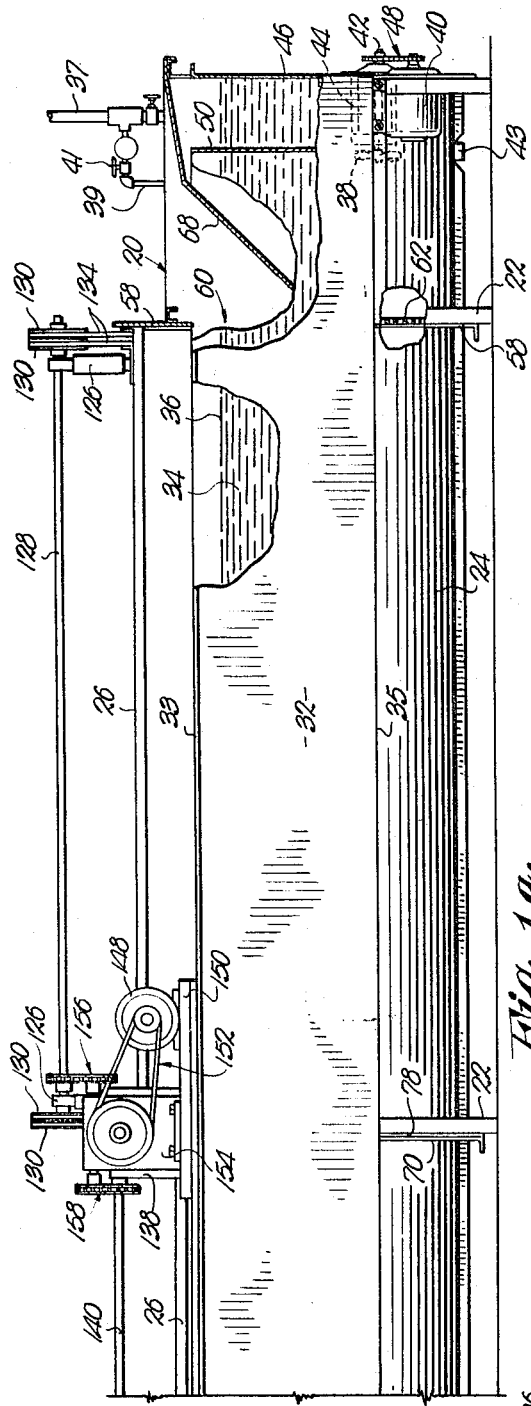
FIGURE 1a is a side elevational view of a portion of the apparatus of the instant invention representing the half of the apparatus adjacent one end thereof, the view illustrating the section of the apparatus utilized for breaking blocks of food products to separate the products from each other, parts being broken away and in section to illustrate details of construction.

An impeller 38 is shown in FIGS. 1a, 2a and 10 at the inlet end 28 of receptacle 20 for creating a flow of liquid 34 in either of a pair of opposed directions by virtue of the connection of impeller 38 with a reversible motor 40 externally of receptacle 20 as shown in FIG. 1a. Impeller 38 is rigid to a shaft 42 carried by a cage-like bearing 44 rigid to the end wall 46 at end 28. A belt and pulley assembly 48 interconnects shaft 42 with motor 40. Suitable control structure (not shown) is connected with motor 40 to effect the reversal in the direction of rotation of its drive shaft.

A baffle 50 extends inwardly from the side of receptacle 20 to which structure 32 is connected, baffle 50 being parallel with wall 46 and coupled with bearing 44 as shown in FIG. 2a. Baffle 50 is utilized for guiding the flow of liquid denoted by the arrows 52 toward bearing 44 as impeller 38 is rotated by motor 40. When motor 40 is reversed, the liquid flow is, of course, in the opposite direction so that baffle 50 would direct the liquid out of receptacle 20 and away from bearing 44.

Figure 1B:
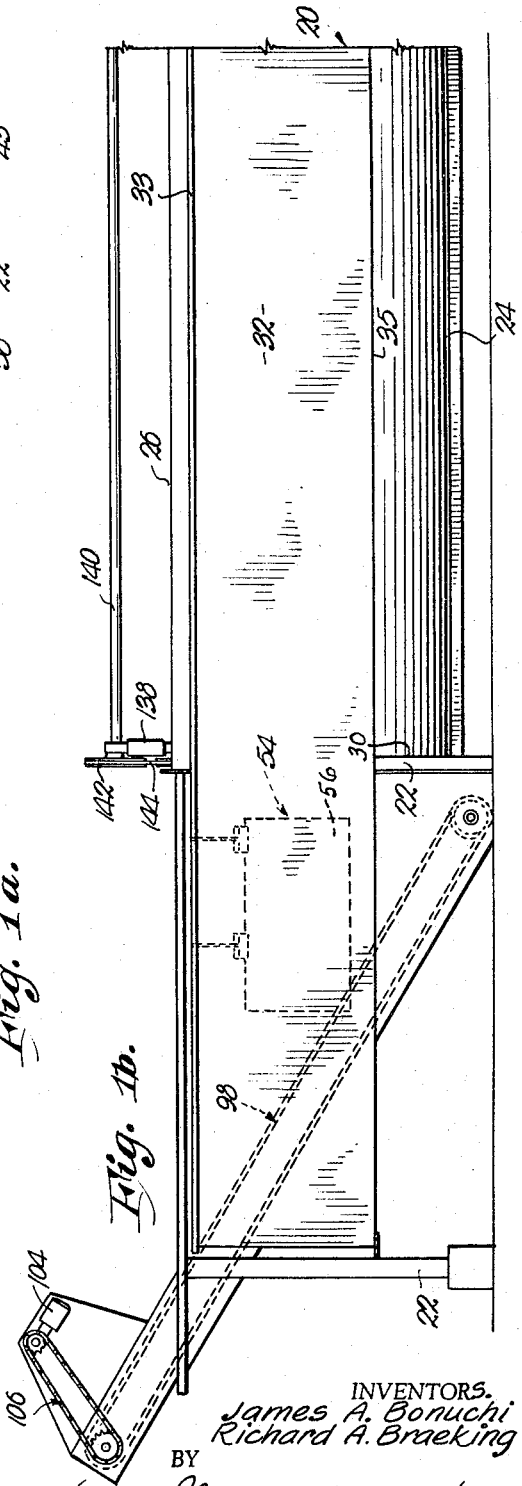
FIG. 1b is the remaining portion of the apparatus representing the other half thereof adjacent the opposite end and providing the section of the apparatus for heating the food products separated from each other in the breaking section.

A source 54 of heat is disposed in structure 32 as shown in FIGS. 1b and 2b to heat the liquid as the same flows under the influence of impeller 38. For purposes of illustration only, source 54 is shown as being comprised of an electrical resistance encased in a housing 56 in thermal interchange relationship to the liquid. Any suitable heat source may be utilized in lieu of the use of the source herein described.

A stationary baffle 58 having an opening 60 therein is rigid to receptacle 20 and parallel with wall 46 thereof as shown in FIG. 1a. Baffle 58 provides backing support for a substantially semicircular grid 62 (FIG. 8) having a plurality of elongated, substantially horizontal slots 64 therein. Grid 62 is in complemental engagement with bottom 24 of receptacle 20 and has a horizontal top edge 66 in spanning relationship to the upper extremities of bottom 24 as shown in FIG. 8.

An inclined ramp 68 overlies baffle 50 and impeller 38 as shown in FIG. 1a and extends downwardly and away from wall 46. The lowermost edge of ramp 68 is in engagement with and secured to the upper edge 66 of grid 62 as shown in FIG. 10. Ramp 68 serves to direct blocks of food products into receptacle 20 and through opening 60 of baffle 58.

Grid 62 is in alignment with impeller 38 as shown in FIG. 10 and the liquid flow created by impeller 38 passes through slots 64 in a direction depending upon the direction of rotation of shaft 42. Grid 62 prevents the movement of blocks of food products or the products separated from each other into the space beneath ramp 68 to thereby prevent the jamming of the impeller 38 by these products.

Figure 5:
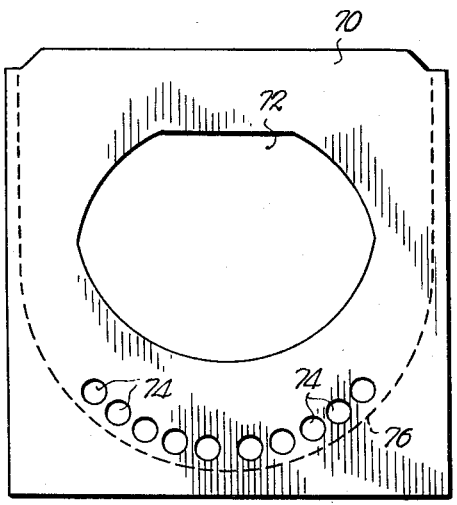
FIG. 5 is an end elevational view of the baffle separating the breaking and heating sections of the apparatus and illustrating the ports which are opened and closed by the gate illustrated in FIG. 4.

A baffle 70 shown in FIG. 5, is provided with a large central opening 72 and a plurality of small openings 74 adjacent the bottom margin thereof. Baffle 70 is secured to receptacle 20 midway between ends 28 and 30 thereof as shown in FIGS. 1a and 9. For purposes of illustration only, receptacle 20 is actually divided into two sections with baffle 70 being disposed between the sections. The dashed line 76 of FIG. 5 represents the outline of bottom 24 with respect to the lower margin of baffle 70.

A U-shaped baffle 78 is disposed in juxtaposition with baffle 70 as shown in FIGS. 1a and 9 and provides a support for an arcuate gate 80 cooperable to open or close opening 74 of baffle 70. In this respect, a pair of rods 82 are shiftably carried by stationary sleeves 84 secured to the upper ends of baffle 78 so that gate 80 may be raised and lowered. Setscrews 86 are threaded into sleeves 84 and bear against rods 82 for holding the same in fixed positions. A crosspiece 88 is rigid to the upper end of each rod 82 respectively, and is accessible from the corresponding side of receptacle 20 to permit manual movement of the corresponding end of gate 80.

Figure 3:
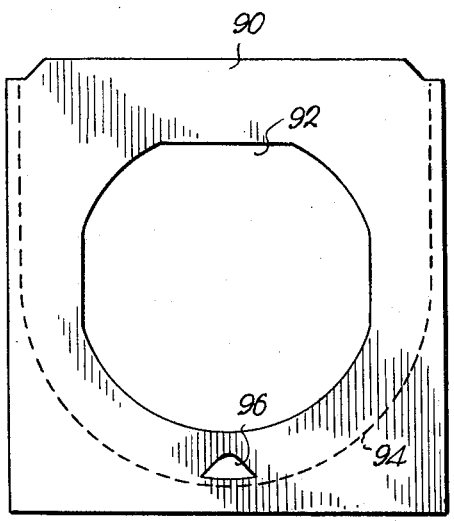
FIG. 3 is an end elevational view of the baffle plate through which the products pass after emerging from the heating section of the apparatus.

Another baffle 90 similar in configuration with baffle 70 is secured to receptacle 20 adjacent end 30 thereof. Baffle 90 is provided with a central opening 92 therein which is larger than the opening 72 of baffle 70. The dashed line 94 of FIG. 3 represents the outline of bottom 24 relative to the lower margin of baffle 90. A triangularly-shaped opening 96 is disposed in baffle 90 adjacent line 94 to permit substantially all of the liquid 34 to drain from receptacle 20 for cleaning purposes. In this respect, the lowermost slots 64 and opening 74 are also adjacent the upper surface of bottom 24 to facilitate the removal of liquid 34 from receptacle 20.

An inclined conveyor 98 is provided in receptacle 20 at end 30 to elevate food products out of receptacle 20 after the same have been heated to a predetermined degree by liquid 34. Any suitable conveyor mechanism may be utilized for this purpose but as illustrated in FIG. 2b, conveyor 98 includes a number of adjacent slats 100 and a plurality of spaced, L-shaped flights 102, slats 100 serving to support the products and flights 102 being disposed for advancing the products upwardly and out of liquid 34. A motor 104 is coupled by a chain and sprocket assembly 106 to conveyor 98 to advance slats 100 and flights 102 in the proper direction.

The products reaching the upper end of conveyor 98 are transferred in any suitable manner to a receiving area remote from receptacle 20. A pair of elongated, hollow members 108 and 110 are disposed in receptacle 20 and respectively represent a block-breaking zone and a product-heating region adjacent the zone.

Figure 6:
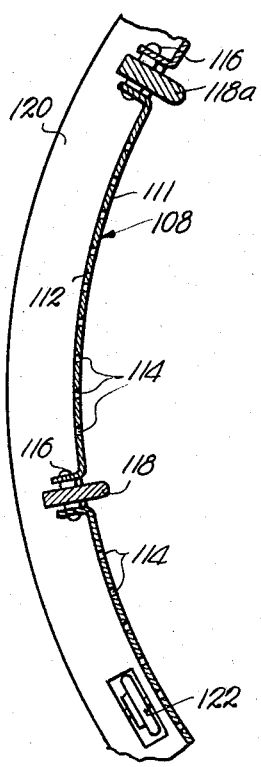
FIG. 6 is an enlarged, fragmentary, end view of the reel or tube utilized in each of the breaking and heating sections of the apparatus.
Figure 7:
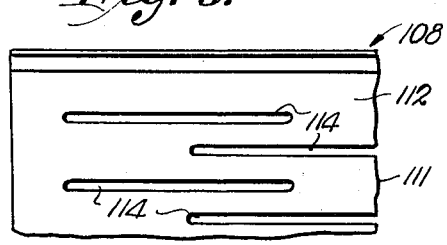
FIG. 7 is a fragmentary, side elevational view of the reel of FIG. 6.

Member 108 comprises an open end, tube, or reel 111 which is provided with a generally cylindrical side wall 112, a portion of which is shown in FIG. 6. Side wall 112 is provided with a plurality of elongated slots 114 so that when reel 111 is partially immersed in liquid 34, the liquid will pass into reel 111 up to a level equal to level 36.

Side wall 112, for purposes of illustration only, is comprised of a number of elongated, transversely arcuate sections as shown in FIG. 6, the sections being interconnected by longitudinally extending bars 118 and spaced pins 116 securing bars 118 to the flanged sides of the sections so that side wall 112 assumes its cylindrical configuration. A number of bars 118, denoted by the numeral 118a, extend inwardly of side wall 112 to a greater distance than the remaining bars 118. Bars 118a serve to lift products in reel 111 as the latter is rotated.

Reel 111 is provided with a flange 120 at each end respectively. A number of circumferentially-spaced rollers 122, only one of which is shown in FIG. 6, are rotatably mounted on each flange 120 respectively, for rotation about an axis substantially radial to the central axis of side wall 112. A portion of each roller 122 projects outwardly from the corresponding flange 120 and engages the structure of receptacle 20 adjacent thereto. For instance, the rollers 122 of the flange 120 adjacent end 28 of receptacle 20, engage the adjacent surface of baffle 58. Likewise, rollers 122 at the opposite end of reel 111 engage and bear against baffle 70 midway between the ends 28 and 30. Rollers 122 facilitate the rotation of reel 111 while at the same time preventing any longitudinal movement thereof relative to receptacle 20.

Receptacle 20 is provided with a pair of longitudinally spaced crossbars 124 which support a pair of bearings 126 which in turn journal an elongated shaft 128 above the open top of receptacle 20. A pair of pulleys 130 is provided at each end respectively of shaft 128. Similarly, a pair of pulleys 132 is rigid to each end respectively of reel 111. A pair of belts 134 is coupled with pulleys 130 and 132 to suspend reel 111 from shaft 128 with the lower extremity of reel 111 being partially immersed in liquid 34 below level 36. By virtue of this construction, reel 111 is rotatable about its longitudinal axis which is disposed horizontally and along the longitudinal axis of receptacle 20.

Figure 4:
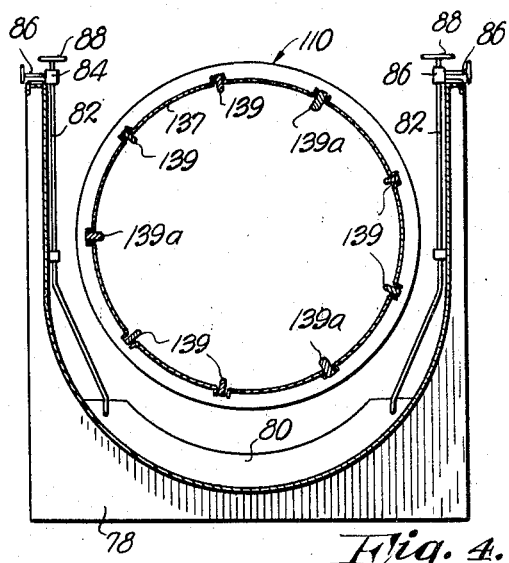
FIG. 4 is an end view of the reel or tube which receives the separated food products and immerses the same in a heating liquid, the view also illustrating a shiftable gate which is to be utilized in conjunction with a baffle illustrated in FIG. 5.

Member 110 is substantially identical in all respects to member 108 and, therefore, the description of member 110 need not be set forth. Member 110 however, is illustrated in cross section in FIG. 4 wherein member 110 is comprised of an elongated reel 137 which may be equal in length to reel 111 if desired. However, the lengths of reels 111 and 137 are generally determined by the time in which it is desired that the various food products remain therein.

Reel 137 is provided with a plurality of elongated bars 139 extending the length thereof and interconnecting adjacent sections in the same manner as bars 118. A number of the bars 139, denoted by the numeral 139a, project into the interior of reel 137 a short distance and serve to create a circulatory flow of the liquid in which reel 137 is immersed as reel 137 is rotated about its longitudinal axis. This circulatory flow of the liquid causes food products in reel 137 to be tumbled about, and thus to be effectively contacted at all exposed areas thereof. Moreover, the tumbling prevents any equilibrium conditions to be established between the liquid and the food products so long as a temperature difference exists therebetween. It is to be noted that reel 137 is provided with end flanges in the same manner as reel 111 and further includes the end flanges similar to rollers 122 of reel 111 as shown in FIG. 6. The rollers of reel 137 bear against baffle 70 and baffle 90 to facilitate the rotation of reel 137, while at the same time preventing longitudinal movement thereof with respect to receptacle 20.

A pair of crossbars 136 are carried on receptacle 20 transversely of its longitudinal axis and support a pair of bearings 138 shown in FIGS. 1a, 2a and 2b. A shaft 140 is journaled in bearings 138 above the open top of receptacle 20. A pulley 142 is rigid to each end respectively of shaft 140 and is coupled with a belt 144, the latter being in turn trained about a pulley 146 rigid to and surrounding the corresponding end of reel 137. By virtue of the presence of belts 144 coupling pulleys 146 with pulleys 142, reel 137 is suspended from shaft 140 and rotatable about its longitudinal axis as shaft 140 is rotated. In FIG. 9, reels 111 and 137 are shown as being of substantially the same diameter, but the longitudinal axis of reel 137 is disposed below that of reel 111. This places the lowermost extremity of reel 137 below the lowermost extremity of reel 111 and thus, reel 111 will be immersed in liquid 34 to a lesser degree than reel 137. The depth of liquid 34 in reel 137 is preferably chosen so that food products in the reel may be substantially completely immersed and capable of being tumbled about in the liquid as reel 137 rotates under the influence of shaft 140 and as the food products advance longitudinally of reel 137.

On the other hand, the depth of liquid 34 in reel 111 is chosen so that blocks of food products disposed therein will not be completely immersed in the liquid but will be broken by striking the inner surface of reel 111 after the blocks have been lifted by bars 118 and then permitted to drop or gravitate onto the inner surface of reel 111. The liquid in reel 111 serves primarily to cushion the fall of the blocks and the separated food products and secondarily, to apply heat to the blocks and products as the blocks are continued to be broken into their individual food products under the influence of the rotation of reel 111.

Reels 111 and 137 are horizontally aligned so that products passing out of reel 111 toward and through opening 72 of baffle 70 will thereafter pass into the proximal open end of reel 137 and into the latter. The opening 72 of baffle 70 is sufficiently large to effect this transition of the products from one reel to the other.

To rotate shafts 138 and 140 an electric motor 148 is carried on a base 150 rigid to the top edges of channel 32 as shown in FIGS. 1a and 2a. A belt and pulley assembly 152 interconnects motor 148 with a gear reducing device 154 also mounted on base 150. A chain and sprocket assembly 156 couples device 154 with shaft 128 to rotate the latter in a predetermined direction as motor 148 is energized. Likewise, chain and sprocket assembly 158 interconnects device 154 with shaft 140 to rotate the latter also in a predetermined direction. Motor 148 is controlled remotely in the same manner as motor 40.

Operation

To prepare the apparatus of the present invention for operation, liquid 34, which is preferably water, is placed in receptacle 20 up to approximately level 36 and the water is heated by source 54 to the temperature required for the particular product and operation. Impeller 38 may be actuated by energizing motor 40 for a predetermined period of time so as to stabilize the temperature of liquid 34 before the blocks of food products are directed into reel 111.

Motor 148 may then be energized to effect the rotation of reels 111 and 137. However, motor 104 need not be energized until it is required that conveyor 98 remove food products from receptacle 20.

The blocks of food products are removed from their containers and placed on ramp 68 and then allowed to gravitate through opening 60 and into reel 111. A predetermined number of the blocks are fed into reel 111, preferably enough blocks to adequately fill the reel 111, without crowding, while at the same time leaving sufficient room to accommodate the food products separated from the corresponding blocks.

It may well be that the blocks may be directed into reel 111 before motor 148 is energized, but this, of course, will be governed by the operator of the apparatus.

Preferably, impeller 38 is rotated in a direction by motor 40 to cause the flow of liquid 34 through receptacle 20 to be in a direction opposite to the direction of arrows 52 at least for the period of time when the initial number of blocks are being broken apart in reel 111. The reason for this direction of flow is to impede any tendency for the separated food products in reel 111 to flow out of the latter and into reel 137. The circulation of liquid 34 past source 54 will serve to maintain the temperature of liquid 34 uniform throughout receptacle 20 and channel 32.

The blocks of food products in reel 111 are alternately lifted by bars 118a and dropped on the inner surface of reel 111, and the impact of the blocks on such inner surface causes the blocks to break apart into their individual food products. The level of liquid 34 in reel 111 is such as to cushion the fall of the blocks or the food products separated therefrom to minimize or completely eliminate any damage that might result by the impact of the blocks and products on the inner surface of reel 111.

The breaking of the blocks in reel 111 continues until it is determined that the same have all been separated into their individual food products. Thereupon, the flow of liquid 34 is reversed by reversing the polarity of motor 40 and the liquid will then flow in the direction of arrows 52 shown in FIG. 2a. Additional blocks of food products will then be placed on ramp 68 and directed into reel 111 through opening 60 of baffle 58. The combination of the circulation of liquid 34 and the addition of more blocks into reel 111 serves to move the separated food products in reel 111 out of the latter, through opening 72 of baffle 70 and into the proximal open end of reel 137. The separated food products are substantially completely immersed in liquid 34, and the products are tumbled about in the liquid by virtue of the circulatory flow created in the liquid in planes substantially perpendicular to the longitudinal axis of receptacle 20 by the rotation of bars 139a under the influence of the rotation of reel 137. The blocks of food products added to reel 111 are sufficient in number to substantially remove all of the products separated from the blocks initially placed in reel 111, and the length of reel 137 is sufficient to accommodate the separated food products without overcrowding the same.

After the breaking of the blocks initially placed in reel 111 has been accomplished, and after the flow of liquid 34 has been reversed to cause the liquid to flow in the direction of arrows 52, the breaking of the blocks and the subsequent heating of the food products continues with little or no attention required on the part of the operator of the apparatus. The food products in reel 137 are maintained therein for a predetermined period of time depending upon the desired end temperature of the products.

There will be a slight tendency for the products in reel 137 to move out of the latter under the influence of the flow of liquid 34 toward conveyor 98. However, by the time the food products are placed in reel 137, motor 104 will have been energized to actuate conveyor 98 in a direction to lift the food products out of receptacle 20. Conveyor 98 will be moving at a relatively slow speed so that even if the flow of liquid 34 causes the food products to move out of reel 137, the conveyor 98 will prevent the food products from moving out of the liquid until such time as the food products are at the proper temperature.

By tumbling the products about in reel 137, the entire exposed area of the products will be contacted by liquid 34 and heated in a manner to preclude any equilibrium conditions being set up between the liquid 34 and the food products so long as the temperatures of the latter are below the temperature of liquid 34.

The products are moved out of receptacle 20 by conveyor 98 after the products have attained the desired temperature and the products are then collected and moved to a handling station remote from receptacle 20.

The flow of liquid 34 need not necessarily be in the directions of arrows 52 during normal operation of the apparatus, but the flow can be in the opposite direction, depending upon the sizes and types of food products to be handled in the apparatus. The movement of the products through reels 111 and 137 will, of course, be slower if the flow of liquid 34 is in the direction opposite to the direction of arrows 52, and sometimes it is desired that this condition exist where there is a tendency for the food products to move from end 28 to end 30 of receptacle 20 as reels 111 and 137 are rotated.

In addition, the flow of liquid 34 may be in the direction of arrows 52 until the food products are ready to move out of receptacle 20 on conveyor 98. Then, the flow can be reversed to impede the movement of the food products toward conveyor 98 so that there will be no overcrowding on the conveyor and the products will remain in the liquid for a slightly greater length of time.

The time during which the products are in reels 111 and 137 will, of course, vary from product to product, and according to the desired end temperatures thereof. Representative times however, for poultry products such as tom turkeys, are as follows: For blocks containing approximately three tom turkeys the blocks are disposed in reel 111 for a period of approximately 75 minutes, while the temperature of liquid 34 is maintained at approximately 70° F. by source 54. After the direction of flow is reversed to move the liquid in the direction of arrows 52, additional blocks are placed on ramp 68 and gravitate into reel 111 whereupon the separated food products in reel 111 then move into reel 137. The food products in reel 137 remain therein for approximately 75 minutes before the same move on to conveyor 98 and out of receptacle 20.

Thus, it is seen that the processes of breaking the blocks and heating the separated food products can be continued concurrently with each other, and the only requirement is that the operator of the apparatus be ready to add new blocks to ramp 68 and to remove the heated separated food products from conveyor 98.

The present invention is adapted for separating a wide variety of food products when the same are frozen together in a breakable block and is also adapted for heating the separated food products immediately after the separation. The apparatus of the present invention is simple to operate and requires a minimum of maintenance, as well as a minimum of operator attention while at the same time, the invention is capable of handling large volumes of food products in relatively short lengths of time.

The present invention may be used to thaw individual frozen carcasses or rounds of a particular variety of meat. In this respect, the invention is suitable for thawing frozen hams, quarters of beef or pork, legs of lamb and other similar products not frozen together in blocks but maintained separate from adjacent products during the freezing process. Although there would be no breaking operation for such products, they would be preheated in reel 111 before passing into reel 137 for completion of the thawing operation.

Having thus described the invention, what is claimed as new and desired to be secured by Letters Patent is:

1. A method for separating and raising the temperature of a plurality of individual food products frozen together in a block, comprising the steps of:
   depositing a plurality of blocks of food products in a quantity of heating liquid overlying a relatively hard surface and at a level to only partially submerge the blocks and at a temperature to thaw said products;
   lifting the blocks from said surface;
   dropping the blocks onto said surface through the liquid overlying the surface to impactively break the blocks and separate the individual food products from each other with the liquid cushioning the shock to protect the products from damage;
   flowing the liquid over the surfaces of the products exposed by the impact to facilitate complete separation of the products; and
   applying heat to the separated food products to raise their temperatures.

2. A method as set forth in claim 1 wherein said blocks are repeatedly lifted then dropped until said products are separated from each other.

3. A method as set forth in claim 1 wherein is included the step of circulating said liquid to facilitate contact of the liquid with the blocks and said products.

4. A method as set forth in claim 3 wherein is included the step of moving said products to a heating zone prior to applying said heat to the separated products and wherein the circulation of said liquid is directed toward said heated zone following separation of said products from each other to facilitate the moving of the products.

5. A method as set forth in claim 4 wherein said heating liquid is water at a temperature of approximately 70° F.

6. A method as set forth in claim 5 wherein said products are permitted to remain in the water for approximately 75 minutes, following which they are removed from the water.

References Cited by the Examiner
UNITED STATES PATENTS

| | | | |
|---|---|---|---|
| 2,128,728 | 8/1938 | Hormel | 99—234 |
| 2,130,237 | 9/1938 | Hormel | 99—194 |
| 2,203,454 | 6/1940 | Bowers | 99—194 |
| 2,331,184 | 10/1943 | Goldthwait | 99—234 |
| 2,649,380 | 8/1953 | Flynn | 99—214 |
| 3,102,819 | 9/1963 | Morrison | 99—194 |

A. LOUIS MONACELL, *Primary Examiner.*

HYMAN LORD, *Examiner.*